(12) United States Patent
Kespohl et al.

(10) Patent No.: US 12,343,895 B2
(45) Date of Patent: Jul. 1, 2025

(54) DEVICE AND METHOD FOR PRODUCING AN ADHESIVE THREAD AND FOR CONNECTING WORKPIECES USING THE ADHESIVE THREAD

(71) Applicant: HEINRICH KUPER GMBH, Rietberg (DE)

(72) Inventors: Hans Werner Kespohl, Delbrück (DE); Heinz Georg Hagenhoff, Delbrück (DE); Reinhold Laumeier, Rietberg (DE)

(73) Assignee: Heinrich Kuper GmbH, Rietberg (DE)

( * ) Notice: Subject to any disclaimer, the term of this patent is extended or adjusted under 35 U.S.C. 154(b) by 173 days.

(21) Appl. No.: 18/017,040

(22) PCT Filed: Jul. 21, 2021

(86) PCT No.: PCT/EP2021/070346
§ 371 (c)(1),
(2) Date: Jan. 19, 2023

(87) PCT Pub. No.: WO2022/018120
PCT Pub. Date: Jan. 27, 2022

(65) Prior Publication Data
US 2023/0294323 A1    Sep. 21, 2023

(30) Foreign Application Priority Data
Jul. 21, 2020 (DE) .......................... 102020119187.1

(51) Int. Cl.
*B29C 65/00* (2006.01)
*B27G 11/02* (2006.01)
(Continued)

(52) U.S. Cl.
CPC ................ *B27G 11/02* (2013.01); *B27D 1/10* (2013.01); *B29C 65/50* (2013.01)

(58) Field of Classification Search
CPC ................................ B27G 11/02; B29C 65/50
See application file for complete search history.

(56) References Cited

U.S. PATENT DOCUMENTS

| 3,849,222 A | 11/1974 | Ortel |
| 4,042,440 A * | 8/1977 | Hasegawa ................ B27D 1/10 |
| | | 156/304.3 |
| 4,389,966 A | 6/1983 | Getz |

FOREIGN PATENT DOCUMENTS

DE    1220583 B    7/1966

OTHER PUBLICATIONS

PCT/EP2021/070346, International Search Report and Written Opinion dated Oct. 27, 2021 (10 pages).

* cited by examiner

*Primary Examiner* — Philip C Tucker
*Assistant Examiner* — Nickolas R Harm
(74) *Attorney, Agent, or Firm* — LOZA & LOZA, LLP; David S. Sarisky

(57) ABSTRACT

The present invention relates to an adhesive thread device for producing an adhesive thread, comprising a supply means for supplying an adhesive-free crude thread, an adhesive tank for receiving and storing an adhesive granulate, a main heater arranged at a lower portion of the adhesive tank to define an activation zone of the adhesive tank in which the adhesive granulate is surface-melted, a closed receptacle substantially horizontally arranged, which is arranged at the activation zone of the adhesive tank with a first end, wherein the closed receptacle comprises at least one inlet opening for supplying, and at least one outlet opening for withdrawing the crude thread, and wherein, when passing the crude thread through the closed receptacle, the crude thread is wetted with adhesive on its entire outer surface in an oxidation-free manner. Furthermore, the pres- (Continued)

ent invention relates to a device for joining workpieces as well as a method for producing an adhesive thread and a method for joining workpieces.

19 Claims, 3 Drawing Sheets

(51) Int. Cl.
*B27D 1/10* (2006.01)
*B29C 65/50* (2006.01)

DEVICE AND METHOD FOR PRODUCING AN ADHESIVE THREAD AND FOR CONNECTING WORKPIECES USING THE ADHESIVE THREAD

CROSS-REFERENCE TO RELATED APPLICATIONS

This application is a National Stage of International Application No. PCT/EP2021/070346, filed Jul. 21, 2021, which claims priority based on German Patent Application No. 102020119187.1, filed Jul. 21, 2020, the entire disclosures of which are incorporated herein by reference.

TECHNICAL FIELD

The present invention relates to an adhesive thread device for oxidation-free surface-melting an adhesive and producing an adhesive thread, a device for joining workpieces, a production method for producing an adhesive thread in an oxidation-free manner, and a method for joining workpieces, in particular wooden workpieces such as parquet strips or veneer strips, using an adhesive thread, wherein no problems due to oxidation of the adhesive will arise.

BACKGROUND

Machines for joining wooden workpieces in various embodiments are known from prior art. Basically, such flat strips can be glued together at their edges, as it is known from DE 10 2016 210 552 B3, for example, or a so-called glue thread is guided in a meandering manner across the joint between two adjacent workpieces at a back side of the workpieces, wherein adhesive may additionally be provided at the joint edges. The glue thread used is produced in advance and is surface-melted using a relatively elaborate heating system before being applied onto the top or backside of the flat wooden workpieces to produce a so-called veneer carpet or the like. A major disadvantage of such machines resides in the heating systems used for surface-melting the prefabricated glue threads. Those glue threads are limited in respect of constructional dimensions as well as energy performance thereof, which means that the throughput speeds of the workpieces always need to be synchronized with the melting temperatures of the glue threads. It is also known to guide a glue thread through an open basin in which molten adhesive is present. The open basin immediately causes oxidation of the adhesive at the surface and, furthermore, in the wood processing industry, leads to contamination by wood dust and the like. Furthermore, a constant temperature of the adhesive in the open melting basin cannot be assured. For this reason, work is often carried out at too high a temperature, resulting in carbonizations of the adhesive, which, under unfavorable conditions, causes the machine to stick or, even more unfavorably, carbonizations will be attached to the veneer carpets or the like. Furthermore, U.S. Pat. No. 4,042,440 B shows a device and a method for joining veneer strips, which are joined with the use of adhesive integrally and dropwise applied to a thread.

SUMMARY

It is an object of the present invention to provide a device and a method for producing an adhesive thread and a device and a method for joining workpieces, in particular flat, strip-shaped wooden workpieces, using an adhesive thread, which device and method enable the workpieces to be securely joined irrespective of a throughput speed of the workpieces using simple design and simple, inexpensive producibility.

This object will be achieved by a device having the features of the claims 1 and 9, respectively, and a method having the features of the claims 12 and 16, respectively. The respective subclaims show preferred further embodiments of the invention.

The adhesive thread device according to the invention for producing an adhesive thread having the features of claim 1 has the advantage that an adhesive thread can be produced from a crude thread in which no impact of oxygen to the adhesive occurs to adversely affect a bonding ability of the adhesive. In particular, there are also no problems arising from prematurely solidified adhesive, since production of the adhesive thread in the adhesive thread device according to the invention will be realized in an oxidation-free manner. This also results in that cleaning effort of the adhesive thread device is reduced. Furthermore, it is possible that any shutdown of the adhesive thread device overnight may be performed without difficulty, and a new start-up of the adhesive thread device following any longer shutdown is possible without difficulty resulting from bonded adhesive residues.

Another advantage of the invention resides in that no escape of large quantities of vapors from the adhesive occurs to endanger a user of the device, for example. Furthermore, it is possible to easily achieve an exact dimension of the adhesive thread by means of exact calibration. Furthermore, the adhesive will be exposed only once to its melting temperature and is kept in stock in sufficient quantity while precisely maintaining the melting temperature. In this way, overheating may be avoided. Furthermore, it is especially possible to allow a wide variety of throughput speeds of the adhesive thread during processing.

According to the invention, this will be achieved with the adhesive thread device for producing the adhesive thread comprising a supply device for supplying an adhesive-free crude thread, and an adhesive tank for receiving and storing an adhesive granulate. Furthermore, a main heater is provided, which is arranged at a lower portion of the adhesive tank. The lower portion forms an activation zone in which the adhesive is surface-melted in an oxidation-free manner. Above the activation zone, a storage zone of the plastic granules is arranged, which effectively shields the molten adhesive from exposure to oxygen, since the adhesive granulate, which is stacked above the molten adhesive, safely prevents penetration of air and thus also prevents oxygen coming up to the molten adhesive, as long as a sufficiently thick layer of adhesive granulate is provided. Furthermore, the device comprises a substantially horizontally extending closed receptacle, which is arranged with a first end at the lower portion of the adhesive tank and will be completely filled with molten adhesive by gravitational action. The closed receptacle has at least one inlet opening for supplying the crude thread, and at least one outlet opening for discharging an adhesive thread which is made of the crude thread and adhesive residues adhering to the crude thread on the entire outer surface when passing through in the molten adhesive. Furthermore, an additional heater is preferably arranged on the closed receptacle to maintain the molten adhesive in the closed receptacle at a predetermined processing temperature. This may be accomplished, for example, by providing a simple control circuit for monitoring the temperature of the molten adhesive in the closed receptacle. In particular, oxidation-free coating of the crude thread may be ensured by passing the crude thread through the closed receptacle in which the molten adhesive is present. The adhesive thread thus produced may then be used, for example, immediately for joining workpieces, in particular wooden workpieces such as veneer strips or the like, or the adhesive thread produced may be dried and wound up on a roll or the like for subsequent use.

The device according to the invention does not necessarily require a conveyor or the like to convey the molten adhesive into the closed receptacle. The molten adhesive may flow independently from the adhesive tank into the closed receptacle due to gravity. As a result, the device may be very inexpensive and of simple design. In a particularly preferred embodiment, gravity transport is assisted in that the outlet openings on the closed receptacle will always be located in or below a center of the activation zone. Alternatively, a substantially pressureless conveyor device is used to convey the molten adhesive.

Preferably, a nozzle is arranged at the outlet opening for the adhesive thread produced by passing the crude thread through the molten adhesive to enable precise calibration of a diameter of the adhesive thread. Preferably, the nozzle is replaceably arranged so that different diameters may be calibrated in a simple and easy manner. Thus, very simple and quick modification of the device may be realized.

Further preferably, a guide device, for example a thin tube, and preferably additionally a thread brake, for example a wrap-around brake or disc brake, is provided at the inlet opening to enable the crude thread to be directly fed into the closed receptacle.

It is preferred that the closed receptacle is arranged in a bridge-like manner above the workpieces to be joined. More preferably, the closed receptacle is a manifold tube.

Further preferably, the adhesive thread device comprises a plurality of separate crude threads and a plurality of inlet openings as well as outlet openings, wherein the crude threads are each fed in parallel to a separate inlet opening and are guided out of a separate outlet opening associated with the respective inlet opening. In this way, several adhesive threads may be produced in parallel in a simple and easy manner and may preferably be used immediately.

According to another preferred embodiment of the invention, the adhesive thread device further comprises a cooling unit, which is arranged above the main heater on the adhesive tank. The cooling unit is to ensure that no excess of adhesive granulate is surface-melted by the main heater. It is particularly preferred that the cooling unit is arranged so that it can be moved in the vertical direction. This allows an activation zone to be set at the adhesive tank in different heights. Thus, for example, when fast throughput time for the adhesive threads is selected, the cooling unit may be pushed further upwards so as to have a large stock of melted adhesive in the adhesive tank available, which stock may then be replenished in the closed receptacle in accordance with adhesive consumption.

Further preferably, the adhesive thread device comprises an at least partially air-filled expansion tube on the closed receptacle to be able to compensate for volume changes of the molten adhesive. Furthermore, this maintains the pressureless state of the molten adhesive in the closed receptacle. Thus, it may be ensured that the molten adhesive in the closed receptacle is present in a pressureless state at the inlet opening and the outlet opening. This prevents adhesive droplets from escaping from the inlet opening or the outlet opening, causing the inlet and outlet openings to become obstructed and/or clogged. Furthermore, adhesive droplets are prevented from adhering to the adhesive thread, causing smearing and/or stains from excess adhesive or the like on the workpieces to be joined. Preferably, the expansion tube is arranged on the closed receptacle between the adhesive tank and the inlet opening and outlet opening. Further preferably, the expansion tube is of open design or, alternatively, of closed design. With the expansion tube closed, it may in particular be ensured that no outgassing of any kind occurs at the adhesive thread device.

Further preferably, the adhesive thread device comprises a conveyor device which is arranged to convey the molten adhesive in a substantially pressureless manner into the closed receptacle and/or to convey it in the closed receptacle. Preferably, the conveyor device is an extruder and further preferably is a heatable extruder. The extruder is further preferably controlled by a control unit at a speed adapted to an unwinding speed of the crude thread. This maintains the pressureless state of the molten adhesive in the closed receptacle.

Preferably, the inlet opening and/or outlet opening at the closed receptacle is at a predetermined acute angle to a straight line which is perpendicular to a longitudinal axis of the horizontally arranged closed receptacle. The angle is preferably formed in a range from 0° to ±30° and may freely be selected in space. Alternatively, the crude thread is fed at a right angle to a central axis of the closed receptacle.

A filling level sensor is further preferably arranged on the adhesive tank to ensure sufficient filling level of adhesive granulate. This sufficient filling level also ensures that no oxygen will reach the surface-melted adhesive, since in particular granulation of the adhesive granules is very fine.

Furthermore, the present invention relates to an apparatus for joining workpieces using an adhesive thread, which comprises an adhesive thread device according to the invention and a working plane for placing the workpieces to be joined. The working plane extends below the closed receptacle of the adhesive thread apparatus. Furthermore, a press-on device is provided for pressing the adhesive thread onto the workpieces to be joined. This allows secure workpiece joining, in particular strip-shaped wooden workpieces, such as veneer strips or parquet strips or wooden lamellas or the like, or wood substitute materials. Further preferably, the adhesive thread produced may be used immediately to directly join the strip-shaped workpieces. Thus, a combined machine for producing an adhesive thread and simultaneously for joining workpieces may be provided. In particular, it is also possible to allow a wide range of throughput speeds for the adhesive thread, for example depending on the workpieces to be joined. No compromises have to be made in terms of efficiency and quality of workpiece assembly. Furthermore, a user is not required to use predefined adhesive threads, but may individually select any crude thread and adhesive raw materials as required and may directly produce the respective adhesive thread. The adhesive thread is produced in an oxidation-free manner, so that the entire device is not affected by the disadvantages of solidified adhesive residues usually arising in prior art.

Preferably, the adhesive threads produced in the adhesive thread device are all applied to the workpieces above the working plane and from above. Alternatively, the adhesive threads are supplied to the workpieces to be joined both from above the working plane and below the working plane. In this way, a joint may be realized simultaneously by adhesive threads on a top side and on a bottom side of the workpieces to be joined. Alternatively, it is also possible for the device to further comprise a turning station in which the workpieces to be joined, which are already joined from above with at least one adhesive thread, are turned by 180° and then sent through the device again on their bottom side to perform a second joining on the bottom side.

According to another preferred embodiment of the invention, a plurality of adhesive threads will simultaneously be applied to the workpieces to be joined. In this regard, the plurality of adhesive threads may exclusively be applied to one side of the workpieces or, alternatively, may be applied to a top side and a bottom side simultaneously.

Furthermore, the present invention relates to a production method for producing an adhesive thread which is adapted to be used for joining workpieces, in particular wooden workpieces or wood-like workpieces. The production method comprises the steps of melting an adhesive granulate in an oxidation-free manner to form a molten adhesive in an activation zone of an adhesive tank, wherein a storage zone of adhesive granulate remains above the activation zone to protect the molten adhesive from oxidation. Thus, the adhesive granulate is surface-melted in the lower region of the adhesive tank, whereas, in the upper region, the adhesive granulate remains in their original granular form. The oxidation-free melted adhesive is fed into a closed receptacle exclusively by gravity or, alternatively, by a conveyor device which is set up to convey the melted adhesive essentially in a pressureless manner. Subsequently, a crude thread is fed through an inlet opening into the closed receptacle for coating an entire outer surface of the crude thread with molten adhesive in an oxidation-free manner to form an adhesive thread, and the adhesive thread thus produced is guided out of an outlet opening from the closed receptacle. Thus, the adhesive-free crude thread may entirely be coated with the molten adhesive so that the entire outer surface thereof is wetted with adhesive. In the closed receptacle, the crude thread may be wetted with the molten adhesive in an oxidation-free manner to produce the adhesive thread.

It is particularly preferred that the adhesive thread will be calibrated when being guided out of the closed receptacle, in particular by using a nozzle. As a result, the adhesive thread produced has a predetermined outer diameter, which may be selected, for example, as a function of the materials to be joined. It is preferred that the nozzle is replaceable.

Further preferred, a plurality of adhesive threads will be produced in parallel and simultaneously.

Furthermore, additional heating of the molten adhesive in the closed receptacle is preferably carried out using an additional heater to prevent solidification of the molten adhesive to always provide a predetermined temperature in the closed receptacle. Further preferably, the adhesive granulate in the adhesive tank is partially cooled to prevent premature melting of the adhesive granulate.

Furthermore, the present invention relates to a method for joining workpieces using an adhesive thread which is produced according to the production method of the invention. The adhesive thread thus produced is then applied to the workpieces to be joined, which are fed onto a working plane. Preferably, the adhesive thread produced is applied to the workpieces to be joined immediately following production thereof.

It is particularly preferred that advance of the adhesive thread and thus also of the crude thread is carried out by advancing the workpieces to be joined. For example, advance of the workpieces may be performed manually by a user of the apparatus or by a driven roller conveyor or the like.

Further preferably, the adhesive is surface-melted in an adhesive tank such that a surface of the molten adhesive in the vertical direction is always located above an outlet opening from the closed receptacle.

Particularly preferably, the molten adhesive is fed from the adhesive tank into the closed receptacle solely by gravity or, alternatively, by means of a conveyor device which is arranged to convey the molten adhesive in a substantially pressureless manner.

Further preferably, an expansion space for the molten adhesive is provided on the closed receptacle. The expansion space is, for example, an open or closed expansion tube or the like.

It is particularly preferred for advance of the crude thread to be performed by advancing the workpieces to be joined. This is possible because the adhesive thread produced is used to join the workpieces immediately following production thereof and it consequently adheres to the workpieces. As soon as the workpieces will be displaced, the adhesive thread will also be displaced and thus also displacing he crude thread, which will preferably be unwound from a roll.

The devices according to the invention and the methods according to the invention are used in a particularly preferred manner when joining strip-shaped and/or flat wood workpieces, for example veneer strips, strip parquet, wood lamellas or the like. Of course, wood substitute materials may also be used.

BRIEF DESCRIPTION OF THE DRAWINGS

While making reference to the accompanying drawing, a preferred example embodiment of the invention will be described in detail In the following, wherein.

DETAILED DESCRIPTION

Hereinafter, while making reference to FIGS. 1 to 3, an adhesive thread device 100 and a manufacturing method for an adhesive thread 10, a device 1 for joining workpieces 16, and a method for joining workpieces 16 will be described in detail.

Figure 1:
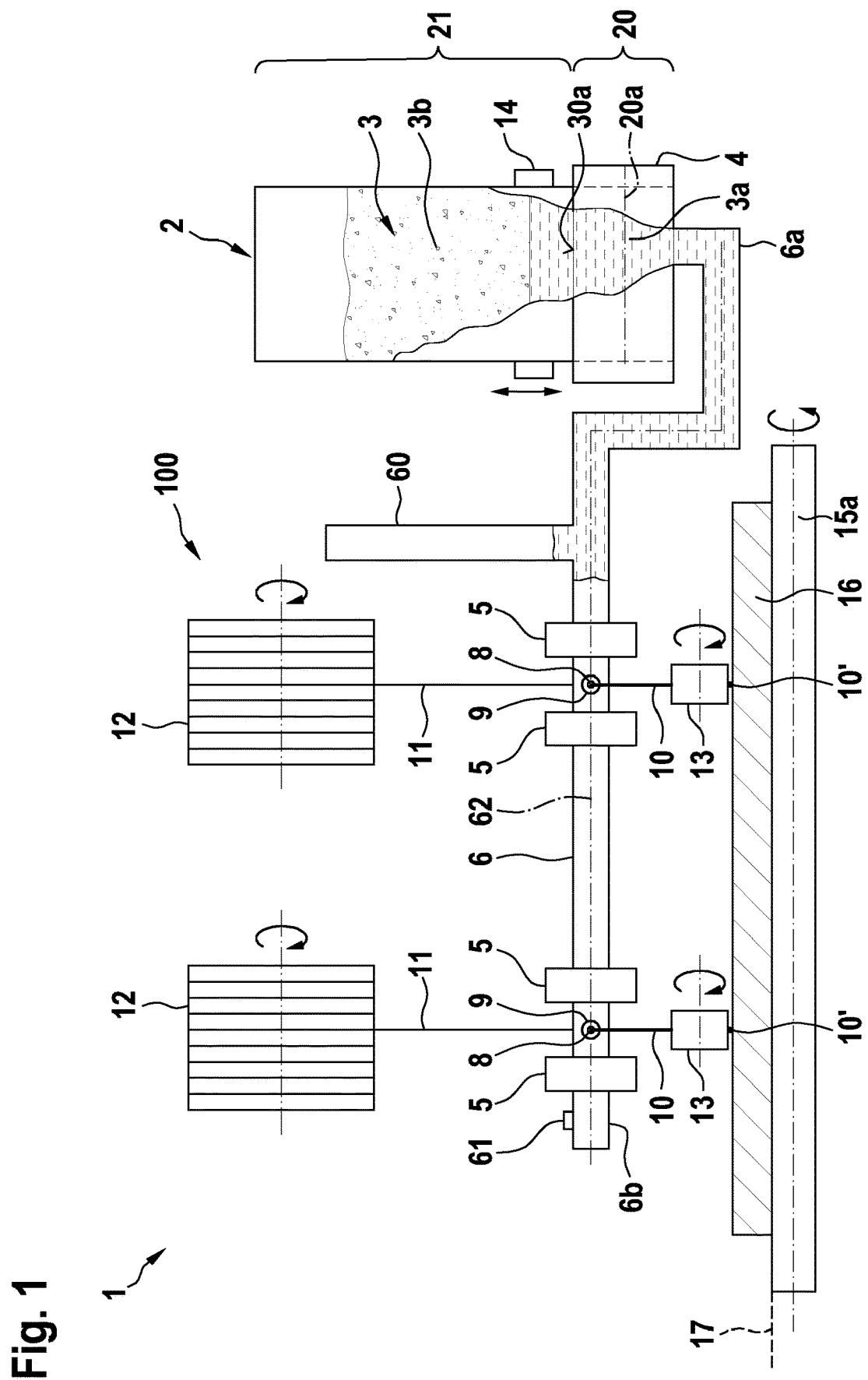
FIG. 1 is a schematic, partially sectional view of a device for joining workpieces according to a preferred example embodiment of the invention.

As may be seen from FIG. 1, the device 1 comprises an adhesive tank 2 filled with adhesive 3, which has an activation zone 20 and a storage zone 21 thereabove. An adhesive granulate 3b is kept in the storage zone 21. Molten adhesive 3a is provided in the activation zone 20.

The adhesive 3 is heated and melted using a main heater 4, which is arranged at a lower portion of the adhesive tank 2.

The workpieces 16 will thus be fed into a horizontal working plane 17 below the adhesive thread device 100. The working plane 17 is defined by a roller track 15 having a plurality of rollers 15a. The roller track 15 is not required to have its own drive, but the device 1 can be put into operation by manually moving the workpieces 16 on the working plane 17. This will be explained below.

As may further be seen from FIG. 1, a cooling unit 14 is arranged on the adhesive tank 2. The cooling unit 14 is positioned above the main heater 4 thus cooling the adhesive granules 3b, which are arranged in the region above the main heater 4. This prevents the adhesive granules 3b, which are arranged above the main heater 4, from being molten prematurely. The cooling unit 14 can be moved vertically.

Furthermore, the device 1 comprises a closed receptacle 6, which, in this example embodiment, is a horizontally arranged distribution tube. In this case, the distribution tube is connected with the activation zone 20 of the adhesive tank 2 such that molten adhesive 3a even reaches the interior of the closed distribution tube solely by gravity. Thus, the closed receptacle 6 is arranged with a first end 6a on the adhesive tank 2, the first end 6a being arranged off-center at the bottom of the adhesive tank. A vent hole 61 is provided at the second end 6b, on the one hand to enable filling of the closed receptacle 6 and on the other hand to provide a means for checking whether the closed receptacle is completely filled with molten adhesive 3a. For opening and closing the vent hole, a vent screw is provided and furthermore, a filling pressure gauge is arranged.

It should be noted that, in addition, a substantially pressureless conveying device, for example a heatable extruder, may also be provided for pressurelessly conveying the molten adhesive into the closed receptacle and/or into the closed receptacle. The conveyor device may vertically be arranged in the adhesive tank itself and/or in the closed receptacle.

The adhesive 3 may thus be kept in the closed receptacle 6 in the molten state under exclusion of oxygen. To prevent a temperature in the closed receptacle 6 from decreasing, a plurality of additional heaters 5 are arranged on the closed receptacle 6.

The temperature of the molten adhesive 3a in the closed receptacle 6 can be controlled by a monitoring control system using a temperature sensor and a control unit that controls the main heater 4 and the additional heaters 5.

Furthermore, the closed receptacle 6 has inlet openings 7 and outlet openings 8. As may be seen from FIG. 3, the inlet openings 7 and outlet openings 8 are arranged such that each inlet opening 7 is associated with an outlet opening 8, thus arranging the inlet openings and outlet openings in a common horizontal plane 62 in the center of the manifold tube. Below this plane 62, a center 20a of the activation zone 20 is located.

This arrangement ensures that the molten adhesive 3a may always be supplied to the closed receptacle 6 by gravity. A surface 30a of the molten adhesive 3a is always located above the inlet opening 7 and the outlet opening 8. This may ensure continuous supply of molten adhesive 3a into the distribution tube to be possible by gravity.

Figure 2:
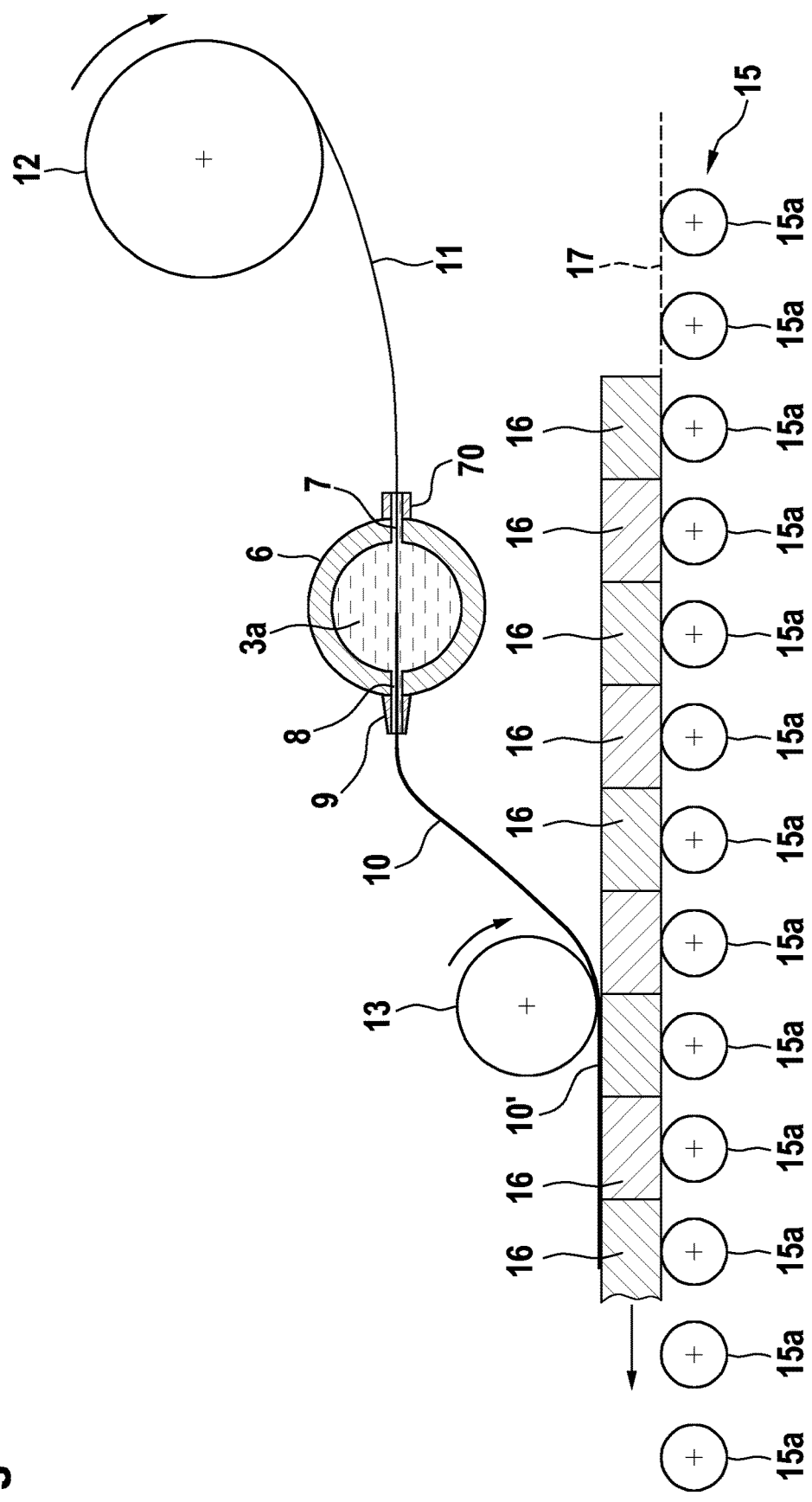
FIG. 2 is a schematic lateral view of the device of FIG. 1 in the stat partially cut away.
Figure 3:
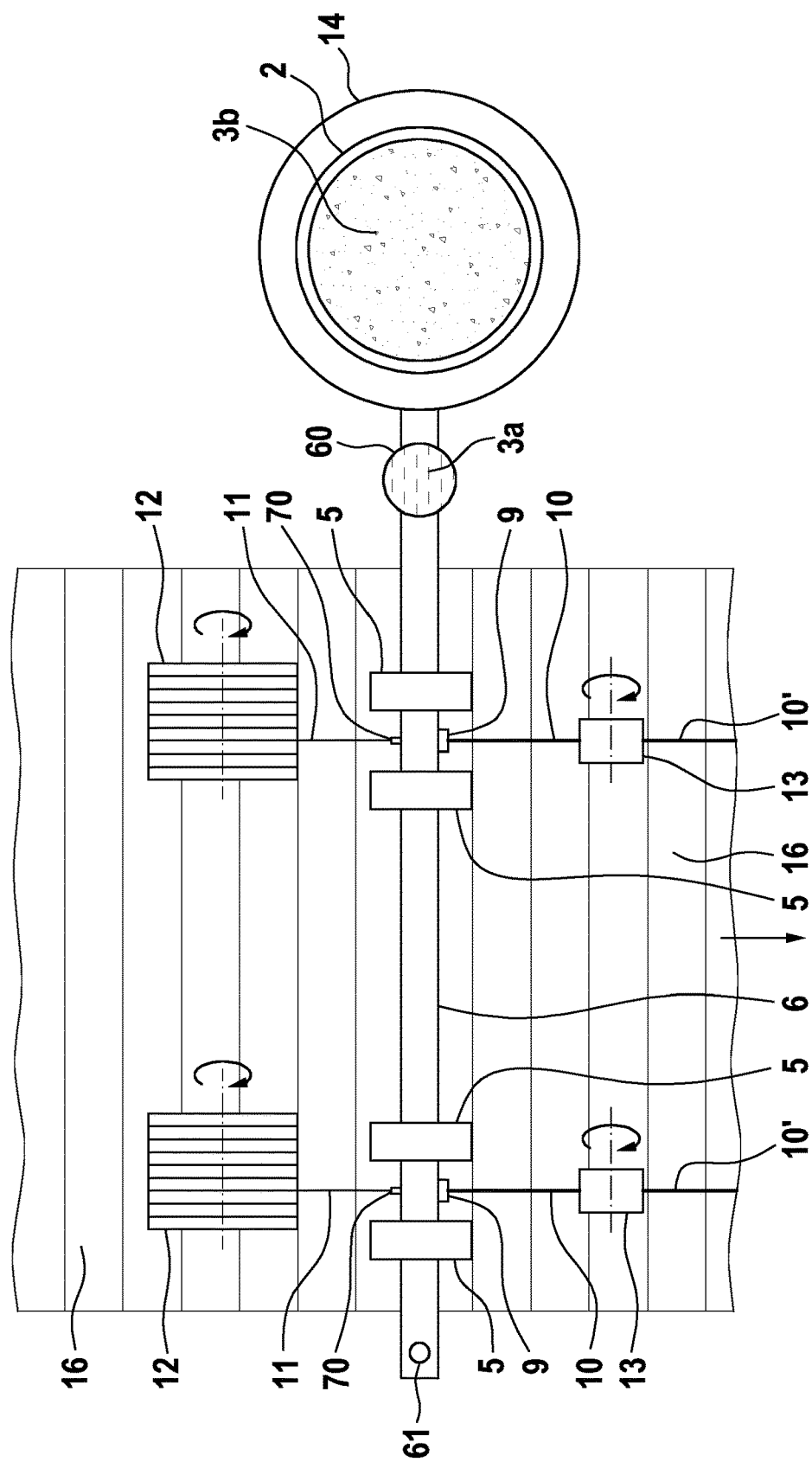
FIG. 3 is a schematic top view of the device of FIG. 1.

As may further be seen from FIGS. 1 to 3, the closed receptacle 6 is arranged in a bridge-like manner above the working plane 17 and thus above the workpieces 16 to be joined.

The adhesive thread device 100 further comprises a crude thread roll 12, from which a crude thread 11 may be unwound, thereby feeding the crude thread 11 into the inlet opening 7. In this example embodiment, as may be seen from FIGS. 1 and 3, two crude thread rolls 12 are provided. The crude thread 11 is fed through the inlet opening 7 into the interior of the closed receptacle 6, where the molten adhesive 3a is devoid of air. As a result, the crude thread 11 is wetted with molten adhesive around its entire outer circumference. The crude thread wetted in this way is then withdrawn through the outlet opening 8 as an adhesive thread 10. A nozzle 9 is provided at the outlet opening 8 to allow calibration of a diameter of the adhesive thread 10.

The nozzle 9 is arranged to be replaceable, so that different nozzle inserts may be used to provide different diameters for the adhesive thread 10. The adhesive thread 10 thus wetted with adhesive is then pressed to an upper side of the workpieces 16 using a press-on roller 13, wherein the workpieces are supplied transversely to the adhesive thread 10. As a result, the adhesive thread is glued onto the upper side of the workpieces 16, which is indicated in FIGS. 1 to 3 by the reference sign 10' for the glued-on adhesive thread.

To enable the crude thread 11 to be fed in a straight line into the closed receptacle 6, a thin guide tube 70 is arranged at each inlet opening 7.

As may further be seen from FIGS. 1 and 3, an expansion tube 60 is arranged in a region of the closed receptacle 6 between the adhesive tank 2 and the first crude thread supply. The expansion tube 60 allows volume changes, which may occur during surface-melting of the adhesive, to be compensated and a pressureless state to be maintained in the closed receptacle 6. This may ensure that the closed receptacle 6 is completely filled with molten adhesive 3a. The expansion tube 60 may be of an open or closed design.

Thus, according to the invention, flat workpieces 16, which, in this example embodiment, are parquet strips, can be joined together using one or more adhesive threads 10. The adhesive thread 10 is produced immediately before application to the workpieces 16 such that the crude thread 11 is passed through a closed receptacle 6 completely filled with oxidation-free molten adhesive 3a and is calibrated at an outlet opening 8 using a nozzle 9 or the like. Replaceability of the nozzle 9 allows a dimension of the adhesive thread 10 to be adjusted.

The molten adhesive 3a may thus automatically be supplied into the closed receptacle 6 by gravity. The crude thread 11 may be fed through the closed receptacle 6 at any desired throughput speed, and it is always ensured that there will always be sufficient wetting of the crude thread 11 with adhesive due to in-flow of molten adhesive 3a.

In this context, the device according to the invention may be switched off overnight with ease, for example, with the molten adhesive 3a curing in the closed receptacle 6 as well as in the activation zone 20 when the heaters are switched off. The next morning, the device 1 may smoothly be restarted by switching on the main heater 4 and the additional heaters 5, and completely re-melting the cured adhesive. During this process, the adhesive does not come into contact with oxygen. There is little risk of coking of the adhesive 3, since the temperature can specifically be controlled by the main heater 4 and the additional heaters 5.

Since the crude thread 11 will only be passed through the closed receptacle 6 filled with molten adhesive 3a, oxidation-free wetting of the crude thread 11 with adhesive may be realized. Compared with open receptacles, this may allow the adhesive thread 10 to be produced essentially without emissions and in a safe manner. Furthermore, it may always be ensured that exact calibration of the adhesive thread 10 will be enabled, thus changing the throughput speed of the crude thread 11 as desired. In particular, it is advantageous that there is no need to provide a separate drive and conveyor device for the molten adhesive, which usually would cause major operational problems with regard to bonding and coking. As may be seen from FIG. 2, the arrangement of the workpieces 16 on the roller track 15 may also be pushed manually under the closed receptacle 6, thereby enabling the bonding process with the adhesive thread 10.

If, in addition to the top side, the bottom side of the workpieces is also to be coated with an adhesive thread, the arrangement of workpieces 16 consisting of a plurality of workpieces may be turned over, for example, on a turning plate or may manually be turned over and pushed through the device 1 for a second time, with the bottom side then facing upwards, to apply adhesive threads 10 to the bottom side accordingly.

Since the path of the adhesive thread 10 travelled between its exit from the nozzle 9 and its application to the workpieces 16 is very short, the adhesive-coated adhesive thread 10 may be applied to the workpieces 16 while still being in the thermoplastic state. To prevent sticking to the press-on rollers 13, the press-on rollers may be wetted with a non-stick agent or the like.

By selecting the volume of the closed container 6 and the size of the main heater 4, the volume of the molten adhesive 3a can also be optimized to suit the specific application and, in particular, excessive amounts of molten adhesive may be prevented during operation. Furthermore, the device 1 is virtually maintenance-free, since even following any standstill and solidification of the molten adhesive, the molten adhesive may be re-melted without difficulty and the crude thread, which solidifies together with the molten adhesive in the closed container 6 when the heaters are switched off, is released again and, by being pulled out through the outlet opening 8 and the nozzle 9, the device is immediately ready for use again.

It should be noted that the adhesive thread device 100 may also be used without the working plane 17 and press-on device 13 described in the example embodiment, and the adhesive thread produced may simply be dried and wound up. As a result, the adhesive thread may then be used to join workpieces at a later point of time.

In addition to the foregoing written description of the invention, explicit reference will be made herein to the graphic representation of the invention in FIGS. 1 to 3 for further disclosure thereof.

LIST OF REFERENCE NUMBERS

1 Device
2 Adhesive tank
3 Adhesive
3a Molten adhesive
3b Adhesive granulate
4 Main heater
5 Additional heater
6 Closed receptacle/manifold tube
6a First end
6b Second end
7 Inlet opening
8 Outlet opening
9 Nozzle
10 Adhesive thread
10' Adhesive thread bonded onto workpiece
11 Crude thread
12 Crude thread roll
13 Press-on roll
14 Cooling unit
15 roller track
15a Rollers
16 Workpiece
17 Working plane
20 Activation zone
20a Center of activation zone
21 Adhesive granulate storage zone
30a Surface of molten adhesive
60 Expansion tube
61 Vent hole
62 Plane
70 Guide tube at inlet opening
100 Adhesive thread device

The invention claimed is:

1. An adhesive thread device for producing an adhesive thread, comprising
   a feeding device for supplying an adhesive-free crude thread,
   an adhesive tank for receiving and storing an adhesive granulate,
   a main heater arranged at a lower portion of the adhesive tank to define an activation zone of the adhesive tank, where the adhesive granulate is melted, and
   a substantially horizontally arranged closed receptacle, which is connected to the activation zone of the adhesive tank with a first end,
   wherein the closed receptacle comprises at least one inlet opening for feeding and at least one outlet opening for withdrawing the adhesive thread, and
   wherein, when passing the crude thread through the closed receptacle, the entire outer surface of the crude thread is wetted with adhesive in an oxidation-free manner, and
   wherein the adhesive thread device further comprises an expansion tube arranged at the closed receptacle between the adhesive tank and the at least one outlet opening.

2. The adhesive thread device of claim 1, wherein a nozzle is arranged at the at least one outlet opening to perform calibration of the adhesive thread and/or wherein at least one additional heater is arranged at the closed receptacle to maintain the molten adhesive in the closed receptacle at a predetermined temperature in the molten state.

3. The adhesive thread device of claim 1, wherein the closed receptacle is a manifold tube.

4. The adhesive thread device of claim 1, comprising a plurality of crude threads, a plurality of inlet openings and a plurality of outlet openings, wherein the crude threads are supplied in parallel to a separate inlet opening, respectively, and are guided out of a separate outlet opening associated with the separate inlet opening.

5. The adhesive thread device of claim 1, further comprising a cooling unit arranged on the adhesive tank above the main heater.

6. The adhesive thread device of claim 1, wherein the at least one outlet opening is located in or below a center of the activation zone of the adhesive tank.

7. The adhesive thread device of claim 1, further comprising a conveyor device arranged to substantially pressurelessly convey the molten adhesive into the closed receptacle and/or to convey it in the closed receptacle.

8. A production method for producing an adhesive thread using the adhesive thread device of claim 1, the method comprising the steps of:
   partially melting the adhesive granulate to obtain a molten adhesive in the activation zone of the adhesive tank, a storage zone of adhesive granulate remaining above the activation zone,
   feeding the molten adhesive into the closed receptacle exclusively by gravitational action, or using a conveyor device which is arranged to convey the molten adhesive essentially in a pressureless manner,
   supplying the crude thread into the closed receptacle through the inlet opening for coating an entire outer surface of the crude thread with molten adhesive to form an adhesive thread in an oxidation-free manner, and guiding the adhesive thread out of the closed receptacle through the at least one outlet opening.

9. The production method of claim 8, wherein the adhesive thread is calibrated when it is guided out of the closed receptacle.

10. The production method of claim 8, wherein a plurality of adhesive threads are produced in parallel and simultaneously.

11. The production method of claim 8, wherein the adhesive in the closed receptacle is heated in addition and/or wherein the adhesive in the adhesive tank is partially cooled.

12. The adhesive thread device of claim 1, wherein the expansion tube compensates for volume changes of the molten adhesive.

13. A device for joining workpieces using an adhesive thread, comprising
an adhesive thread device comprising:
a feeding device for supplying an adhesive-free crude thread,
an adhesive tank for receiving and storing an adhesive granulate,
a main heater arranged at a lower portion of the adhesive tank to define an activation zone of the adhesive tank, where the adhesive granulate is melted,
a substantially horizontally arranged first closed receptacle, which is connected to the activation zone of the adhesive tank with a first end,
wherein the first closed receptacle comprises at least one inlet opening for feeding and at least one outlet opening for withdrawing the adhesive thread, and
wherein, when passing the crude thread through the first closed receptacle, the entire outer surface of the crude thread is wetted with adhesive in an oxidation-free manner,
wherein the adhesive thread device further comprises an expansion tube arranged at the first closed receptacle between the adhesive tank and the at least one outlet opening, and
a working plane for placing the workpieces to be joined, which extends below the closed receptacle, and
a press-on device for pressing the adhesive thread onto the workpieces to be joined.

14. The device of claim 13, wherein the adhesive thread is supplied above the working plane onto the workpieces.

15. The device of claim 13, further comprising a second closed receptacle connected to the activation zone of the adhesive tank, wherein the first closed receptacle is arranged above the working plane and the second closed receptacle is arranged below the working plane.

16. A method of joining workpieces using an adhesive thread and the device of claim 13, the method comprising the steps of:
producing the adhesive thread by:
partially melting an adhesive granulate to obtain a molten adhesive in the activation zone of the adhesive tank, a storage zone of adhesive granulate remaining above the activation zone,
feeding the molten adhesive into the closed receptacle exclusively by gravitational action, or using a conveyor device which is arranged to convey the molten adhesive essentially in a pressureless manner, and
supplying the crude thread into the closed receptacle through the at least one inlet opening for coating an entire outer surface of the crude thread with molten adhesive to form the at least one adhesive thread in an oxidation-free manner, and guiding the adhesive thread out of the closed receptacle through the at least one outlet opening,
feeding the workpieces to be joined onto the working plane, and
directly applying the adhesive thread withdrawn from the at least one outlet opening to the workpieces to be joined.

17. The method according to claim 16, wherein an advance of the crude thread is performed by advancing the workpieces to be joined.

18. The production method of claim 16, wherein the workpieces are wooden workpieces or workpieces made of wood substitute.

19. The device of claim 13, wherein the workpieces are wooden workpieces or workpieces made of wood substitute.

* * * * *